United States Patent
Singh et al.

(10) Patent No.: US 11,397,665 B2
(45) Date of Patent: Jul. 26, 2022

(54) CHAOS ENGINEERING TRIALS

(71) Applicant: JPMORGAN CHASE BANK, N.A., New York, NY (US)

(72) Inventors: Garima Singh, Singapore (SG); Deepak Sarda, Singapore (SG); Yang Yu, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/795,860

(22) Filed: Feb. 20, 2020

(65) Prior Publication Data

US 2021/0263836 A1 Aug. 26, 2021

(51) Int. Cl.
*G06F 11/36* (2006.01)
*H04L 67/10* (2022.01)

(52) U.S. Cl.
CPC ...... *G06F 11/3688* (2013.01); *G06F 11/3664* (2013.01); *H04L 67/10* (2013.01)

(58) Field of Classification Search
None
See application file for complete search history.

(56) References Cited

U.S. PATENT DOCUMENTS

| | | | | | |
|---|---|---|---|---|---|
| 8,745,641 | B1* | 6/2014 | Coker | ................. | G06F 11/3668 719/328 |
| 10,684,940 | B1* | 6/2020 | Kayal | ................. | G06F 11/3664 |
| 10,795,793 | B1* | 10/2020 | Arunachalam | ..... | G06F 11/0709 |
| 2002/0116153 | A1* | 8/2002 | Wybouw-Cognard | | G06F 11/3688 702/186 |
| 2016/0078458 | A1* | 3/2016 | Gold | ................. | G06Q 30/0203 705/7.32 |
| 2017/0315902 | A1* | 11/2017 | Moretto | ............. | G06F 11/3692 |
| 2020/0136911 | A1* | 4/2020 | Assali | ................. | H04L 41/5058 |
| 2020/0159644 | A1* | 5/2020 | Beltran | ................. | G06N 20/00 |
| 2020/0322218 | A1* | 10/2020 | Anwer | ............... | H04L 41/0893 |

OTHER PUBLICATIONS

Basiri et al., "Chaos Engineering," IEEE Software, 2016, 7pg. (Year: 2016).*
International Searching Authority, PCT International Search Report and Written Opinion, International Application No. PCT/US2021/019008, dated Apr. 14, 2021, pp. 1-9.
Basiri et al., "Chaos Engineering", IEEE Software, May/Jun. 2016, 7 pp.

* cited by examiner

*Primary Examiner* — Ryan D. Coyer
(74) *Attorney, Agent, or Firm* — Greenblum & Bernstein, P.L.C.

(57) ABSTRACT

Embodiments disclosed herein provide for systems and methods for implementing chaos engineering in distributed systems with chaos engineering trials. The systems and methods provide for a RESTful API that is configured to generate a chaos engineering experiment including a plurality of steps that test one or more conditions in the distributed system as well as generate a chaos engineering trial based on the chaos engineering experiment and one or more parameters.

14 Claims, 9 Drawing Sheets

```
{
    "id": "9ed4e64e-4964-4833-9edf-434d7ff86722",
    "name": "<app_name> intra-pool resilience",
    "description": "Test application intra-pool resilience",
    "parameters": {
        "app_url": "http://example.jpmorganchase.com",
        "ap_name": "sample-app",
        "env": "test",
        "pool": "SG",
        "org_name": "CF-ORG-NAME"
    },
    "pre_steps": [
        {
            "step": "HTTP health check",
            "do": "cm.http_probe",
            "where": {
                "url": "{{ app_url }}"
            }
        }
    ],
    "steps": [
        {
            "step": "Kill CF Instance",
            "do": "cf.terminate_some_random_instance",
            "where": 1,
            "app_name": "{{ app_name }}",
            "env": "{{ env 1l }}",
            "pool": "{{ pool }}",
            "org_name": "{{ cloud_foundry_org }}"
        },
        {
            "step": "HTTP health check",
            "do": "cm.http_probe",
            "where": {
                "url": "{{ app_url }}"
            }
        }
    ]
}
```

FIG. 1C

```
{
    "name":         "Kafka Timeout Failure Injection",
    "description": "Test application resiliency to Kafka connection timeout during streaming an event",
    "metadata": {
        "type": "kafka-resiliency",
        "target_env": "UAT"
    },
    "pre_steps": [
        {
            "step": "Probe/ send endpoint and make sure it returns valid response",
            "do": "cm. http_probe",
            "where": {
                "url": "https://eris-kafka-sample-app.example.net/send?message=pre-check-message"
            },
            "expect": [
                {
                    "operator": "regex",
                    "response_text": "Message pre-check-message queued for processing"
                }
            ]
        }
    ],
```

CHAOS ENGINEERING TRIALS

FIELD OF THE INVENTION

The present invention relates generally to systems and methods for implementing chaos engineering in distributed systems with chaos engineering trials.

BACKGROUND OF THE INVENTION

Chaos engineering corresponds to the practice of experimenting of a distributed system in production in order to build confidence in the system's capability to withstand turbulent conditions. In particular, chaos engineering involves the creation of a hypothesis around a steady-state mode of the distributed system in order to define acceptable thresholds for a normal operating state as well as when the distributed system is experiencing turbulence. Hypotheses are tested via experiments, e.g., chaos engineering experiments, in order to determine if the distributed system behaves as expected, i.e., validates the hypothesis, or not, i.e., violates/invalidates the hypothesis. These hypotheses are applied to the distributed system via failure injections. The distributed system's response to the failure injections is observed and then used to determine the hypothesis' validity. If the hypothesis is validated, then confidence in the distributed system's resiliency can be increased. Otherwise, if the hypothesis is violated, the distributed system will need to be upgraded based on the scenarios defined in the hypothesis. Accordingly, even if the chaos experiments fail, they can help discover and mitigate failure modes in the distributed system, which, when addressed, can lead to increased resiliency. However, the current chaos engineering experiments are hand crafted and customized for the particular environment they are being applied to. As such, these chaos engineering experiments cannot be reused for other environments, thereby necessitating the creation of unique chaos engineering experiments for each environment. For example, an experiment for checking high availability of an application in a specific region has to be re-written for another region. Similarly, there is currently no ability for sharing the chaos engineering experiments between the different environments. Further, because each chaos engineering experiment has to be uniquely specified for a particular environment, the likelihood of a missed step/action increases, thereby resulting in decreased confidence in the experiment specification. Current systems also fail to keep track of how a particular chaos engineering experiment is run in different environments as well as how the particular "runs" relate to each other. Lastly, current systems also fail to maintain an audit log showing the impact of the experiment on the distributed system over its execution history.

Accordingly, there is a need for systems and methods which can overcome at least some of the deficiencies described herein above.

SUMMARY OF THE INVENTION

One aspect of the present disclosure relates to a computer-implemented method for implementing chaos engineering in a distributed system. According to an embodiment, the computer-implemented method can include: generating, with a Representational State Transfer (RESTful) application programming interface (API), a chaos engineering experiment, wherein the chaos engineering experiment includes a plurality of steps that test one or more conditions in the distributed system; generating, with the RESTful API, a chaos engineering trial based on the chaos engineering experiment and one or more parameters; and executing, with a processor, the chaos engineering trial in the distributed system.

Further, another aspect of the present disclosure relates to a system for implementing chaos engineering in a distributed system. According to an embodiment, the system can include: (i) a RESTful API, wherein the RESTful API is configured to: (a) generate a chaos engineering experiment, wherein the chaos engineering experiment includes a plurality of steps that test one or more conditions in the distributed system; and (b) generate a chaos engineering trial based on the chaos engineering experiment and one or more parameters; and (ii) a processor, wherein the processor is configured to execute the chaos engineering trial in the distributed system.

Further, the system can also include a central API which is configured to store data from a variety of applications in order to: (a) generate events which can be consumed by teams for monitoring and notification purposes; (b) allow reporting on the distributed system's resiliency posture for auditors and other control personnel (e.g., a technology controls officer); and (c) automate resiliency controls.

According to the embodiment, the system can also include a chaos engineering experiment recommendation engine, which can scan a distributed system's architecture in order to suggest chaos engineering experiments to users.

According to an embodiment, the present invention can provide the following advantages: (i) the chaos engineering trials can be used to help classify each experiment execution as a unique instance for a specific environment and/or situation with related logs/records, (ii) the chaos engineering experiments can be shared and/or reused as artifacts, (iii) application developers can begin to think about the chaos engineering experiments as production code, which can be promoted through environments to run in production, and the chaos engineering trials as the unique runs (executions), and (iv) auditors can define chaos experiments for controls and create automated tollgates to satisfy for running. Further, because each chaos engineering trial is unique, the same chaos engineering experiment can be executed multiple times with different parameters. Further, auditability can be provided since results are tagged to the trials and not the experiments.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE INVENTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1A:
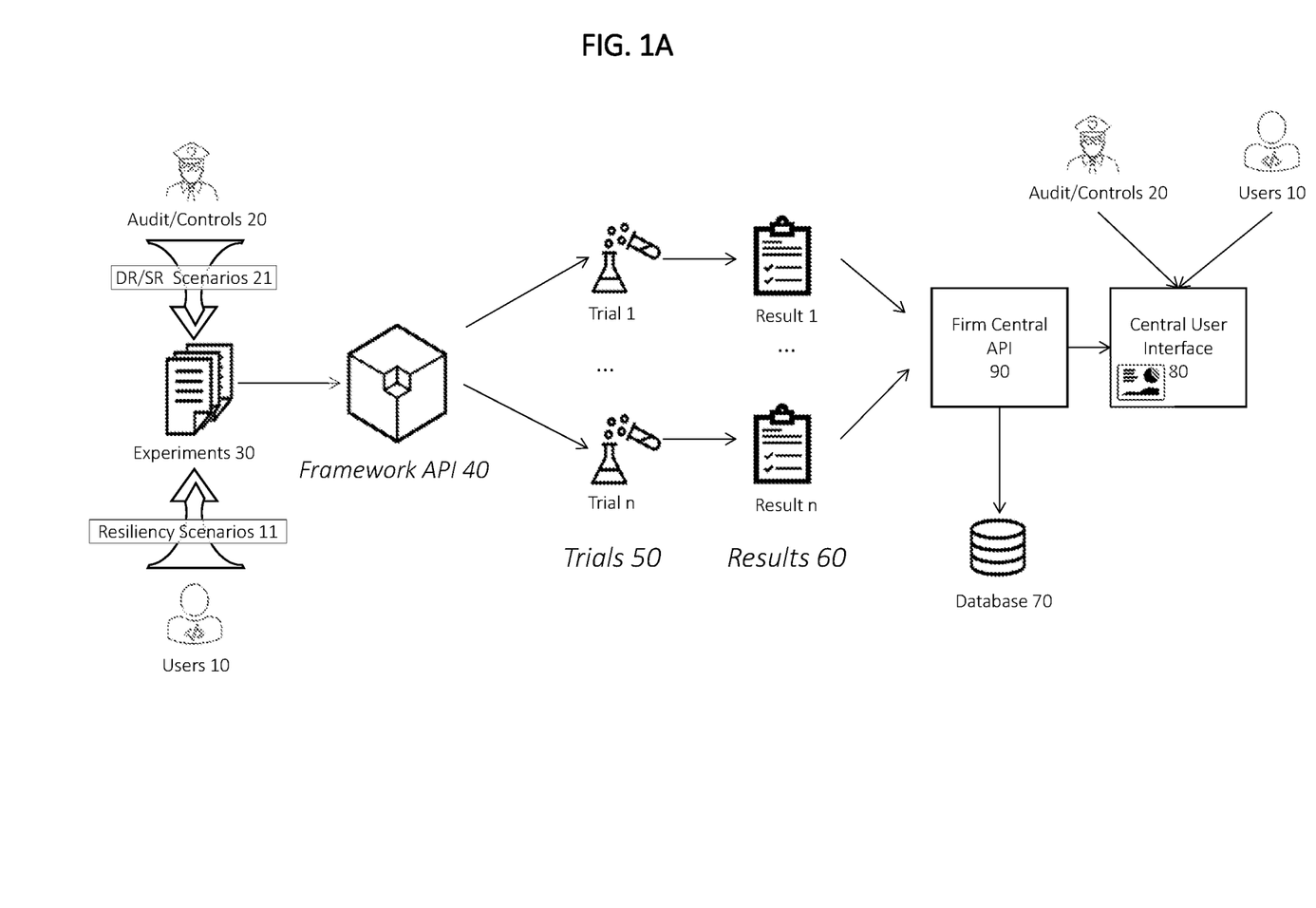
FIG. 1A illustrates a process flow according to an exemplary embodiment of the present invention.
Figure 1B:
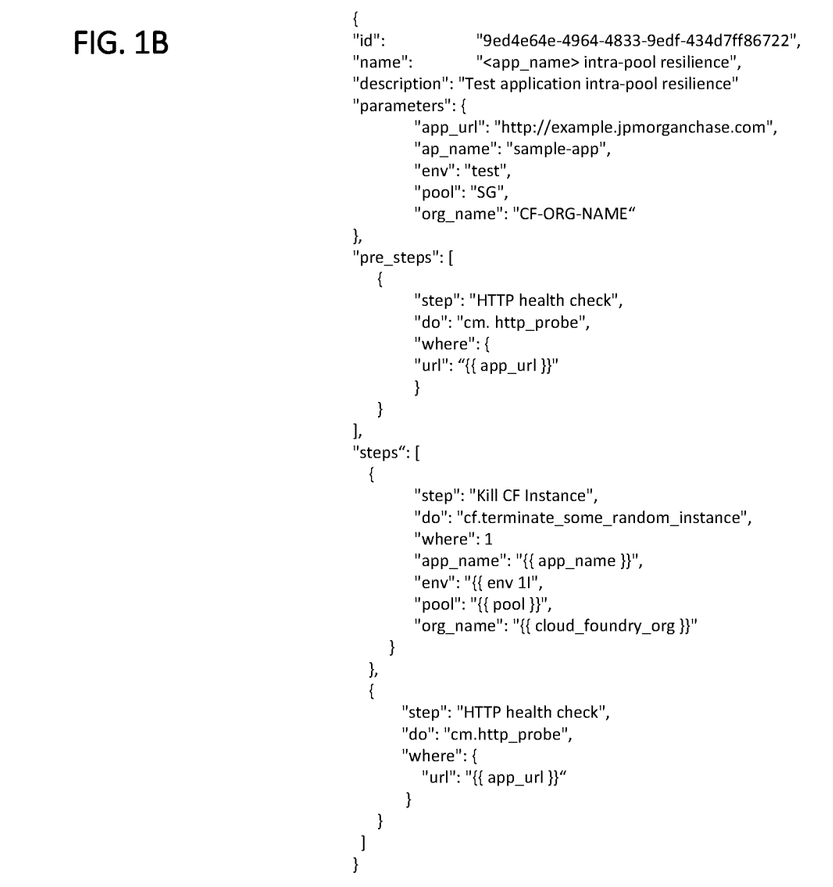
FIG. 1B illustrates a chaos experiment according to an exemplary embodiment of the present invention.
Figure 1C:
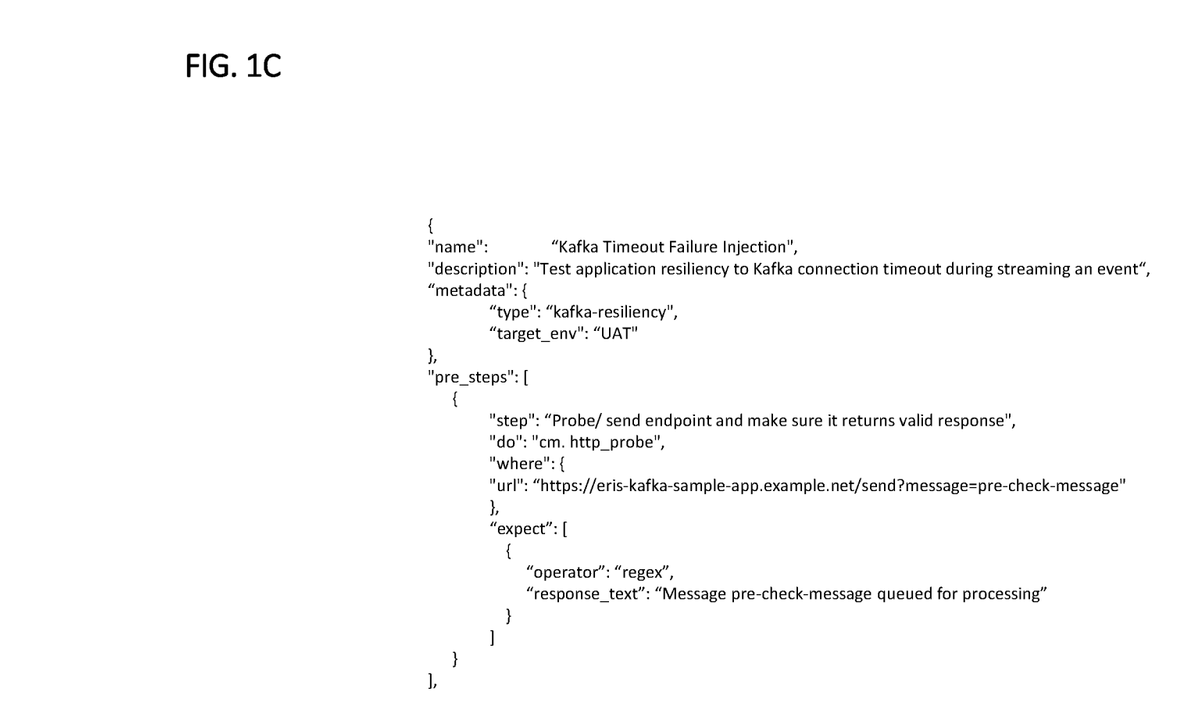
FIG. 1C illustrates a chaos experiment according to another exemplary embodiment of the present invention.

FIG. 1A illustrates a process flow according to an exemplary embodiment of the present invention. As depicted in the figure, the process flow can include (i) the generation of chaos engineering experiments 30, (ii) the generation of chaos engineering trials 50 based on at least one generated experiment 30, (iii) the execution of at least one chaos engineering trials 50, (iv) the generation of unique and distinct results 60 corresponding to each of the executed chaos engineering trials 50, (v) the storing of the generated results 60 in a database 70, and (vi) the presentation of the generated results via a user interface and API 80. According to an embodiment, the chaos engineering experiments 30 can be generated based on resiliency scenarios 11 provided by a user(s) 10 as well as disaster recovery (DR) and site recovery scenarios (SR) 21 provided by auditors/control personnel 20. According to an embodiment, auditors/control personnel 20 can describe regulatory resiliency scenarios, such as DR/SR scenarios 21, which can then be used to generate the chaos engineering experiments 30. Further, because the generated results 60 are unique and specific to corresponding chaos engineering trials 50, the chaos engineering trials 50 can be used by the auditors/control personnel 20 to validate if mandatory controls are met. In particular, the chaos engineering experiments 30 can be generated via a framework Representational State Transfer (RESTful) application programming interface (API) 40. Further, the chaos engineering experiments 30 can be represented in a JavaScript Object Notation (JSON) format, which is easy to read and share as a document. Further, an advisory UI can be used by the auditors/control personnel 20 in the creation of the experiments in the JSON format via the RESTful API 40. In particular, the auditors/control personnel 20 can create mandatory controls based on regulatory expectations of disaster recovery/sustainer resiliency. The adherence to these controls can be demonstrated by creation of chaos engineering experiments and trials. According to an embodiment, each chaos engineering experiment 30 can include a plurality of steps (e.g., actions & probes written in the form of code, markup languages, etc.) that test/simulate turbulent conditions in one of an application or production environment of a particular distributed system (e.g., servers, computer processors, etc.). For example, the chaos engineering experiment 30 can include steps that test at least one of resiliency, disaster recovery, and site recovery of a distributed system. FIG. 1B illustrates an example of a chaos engineering experiment represented in the JSON format. As depicted in the figure, a chaos engineering experiment can include information regarding at least one of (i) the steady-state of the system (e.g., steady-state can be measured by the "cm.http_probe," which should return a success response during steady state), (ii) the system components being checked during the experiment (e.g., via the "app_name" attribute, which corresponds to the specific app component being checked in the experiment), (iii) a unique identification associated with the experiment, (iv) name associated with the experiment, (v) description of the experiment, (vi) parameters associated with the experiment, and (vii) pre-steps and steps associated with the experiment. According to an embodiment, pre-steps are used to verify that the system is in the state that it is expected to be in before injecting failures. Pre-steps can be composed of one or more check steps. If any of them fail, then the "steps" corresponding to the actual chaos engineering experiment are not executed and the experiment execution is aborted. This is useful to prevent execution of chaos engineering experiment against a system which is already in an unhealthy state. Further, according to an embodiment, during the execution of the chaos engineering trials 50, parameters in the chaos engineering experiment 30 can be overwritten with different parameters, thereby allowing for the re-use of experiment specifications by a plurality of environments, e.g., test and production. As such, the chaos engineering experiment 30 can be treated as production code that could be tested in each of the plurality of environments. Further, FIG. 1C illustrates an example of metadata in a chaos engineering experiment. As depicted in the figure, the metadata can include information regarding the metadata type as well as the target environment.

Further, with regard to FIG. 1A, the chaos engineering trials 50 can be generated via the API 40. According to an embodiment, a chaos engineering trial 50 can be an instance of the chaos engineering experiment 30. Specifically, the chaos engineering trial 50 is an instance of the experiment for a particular environment and which is executed at a particular time (e.g., chaos engineering trial 50=chaos engineering experiment 30+ environment+ time schedule). As such, the chaos engineering trial 50 is initiated against the chaos engineering experiment 30 and runs the steps of the chaos engineering experiment 30 and generates results 60. According to an embodiment, the particular environment (e.g., test or production) or time (or other external variation) can be provided by the user(s) 10 as one or more parameters via the API 40. After a chaos engineering trial 50 is executed, the corresponding result 60 can then be stored in an immutable storage database 70 by a central API 90. Further, according to an embodiment, the results 60 stored in the database 70 can be presented to the user(s) 10 and/or auditors/control personnel 20 via the user interface and API 80. Further, according to another embodiment, the experiments 30 and the trials 50 can also be presented to the user via the user interface and API 80.

Figure 2:
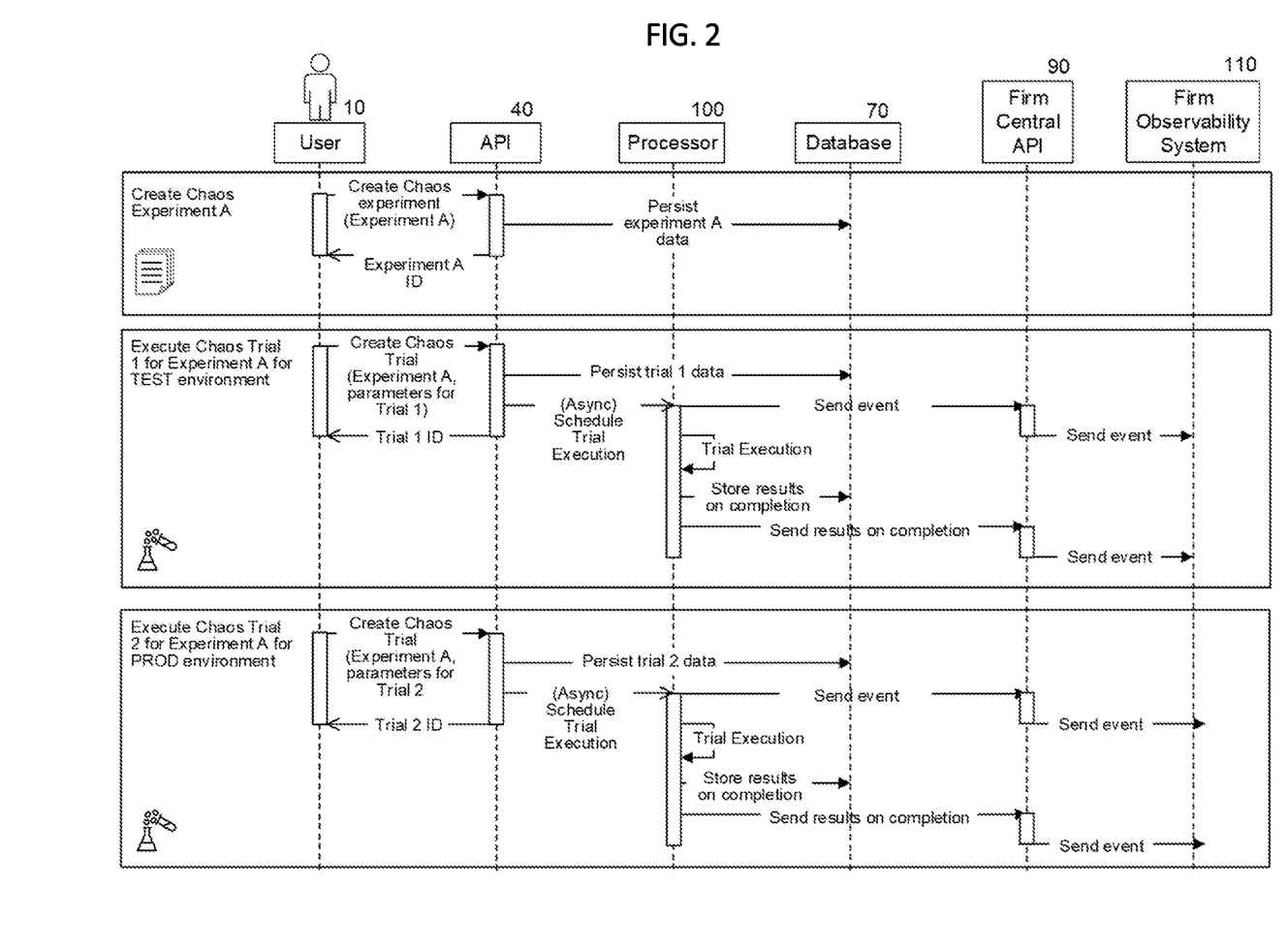
FIG. 2 illustrates an interaction between components of an exemplary system according to an exemplary embodiment of the present invention.

FIG. 2 illustrates an interaction between components of an exemplary system according to an exemplary embodiment of the present invention. In particular, the figure depicts the interaction between the user(s) 10 (and/or auditor/control personnel 20), the API 40, a processor 100, the database 70, the central API 90, and an observability system 110. According to an embodiment, the observability system 110 can include a messaging system (e.g., Apache Kafka)

that permits the publication, routing, and consumption of events. The events routed through the messaging system can then be persisted through a search system (e.g., Elasticsearch) that permits the querying of events by interested users or systems. Further, according to an embodiment, in a first step, the user(s) 10 generates a chaos engineering experiment A via the API 40. Specifically, the user(s) 10 and/or auditor/control personnel 20 can interact with the API 40 to provide the chaos engineering experiment A, based on which, subsequent chaos engineering trials can be scheduled and/or executed. After the chaos engineering experiment A is generated, it may then be stored in the database 70. Further, as depicted in the figure, a unique ID associated with the generated experiment, e.g., "Experiment A ID," is created and provided to the user 10 to keep track of the experiment. In addition, the generated chaos engineering experiment A can also be presented to the user(s) 10, e.g., via the user interface and API 80 (not shown).

Then, in a second step, the user(s) 10 can generate a first chaos engineering trial for chaos engineering experiment A, e.g., chaos engineering trial 1. In particular, chaos engineering trial 1 can be generated for a particular test environment, e.g., "TEST." According to an embodiment, chaos engineering trial 1 can be generated based on the chaos engineering experiment A stored in the database 70 and a number of parameters provided by the user(s) 10, e.g., particular environment, particular time, external factors, etc. After the chaos engineering trial is generated, it can then be stored in the database 70 and/or presented to the user(s) 10 via the user interface and API 80. In addition, a unique ID associated with the generated trial, e.g., "Trial 1 ID," can also be created and provided to the user 10. As depicted in the figure, chaos engineering trial 1 can be executed by the processor 100. According to an embodiment, chaos engineering trial 1 can be executed to test at least one of (i) a computer application, (ii) container in which the computer application is running, (iii) the infrastructure platform on which the container is available, and (iv) the network layer underlying the computer application, the container, and the infrastructure platform. For example, with the regard to the computer application, latency and exceptions can be injected into the controller and repository classes of the computer application code. Further, the circuit breakers can also be tested and/or the logic can retried. Circuit breakers correspond to software patterns that are used to be resilient to failures in downstream dependencies. For example, if A needs data from B and B is having trouble, then a naïve retry mechanism in A will keep swamping B and, therefore, prevent recovery. However, circuit breakers implement a sophisticated retry mechanism wherein after a threshold of failures in connecting to B, the circuit is made "open;" after which, any attempt to connect to B is discarded and, instead, a default response is provided to the caller. In parallel, attempt is made to reconnect to B using exponential backoff. Once connection is re-stablished, the circuit is "closed" and connection to B is permitted and normal operation is restored. Further, with the regard to the container, it can be either stopped, killed, scaled up or scaled down. Further, with regard to the infrastructure platform, the associated virtual machine (VM) running on the infrastructure platform can either be stopped or restarted. Lastly, with regard to the network layer, the network traffic can be manipulated by (i) manipulating the control plane of the network, which affects how the network is configured, by, for example, adding or removing Cloud Foundry routes, Kubernetes ingress mapping, etc. and/or (ii) manipulating the data plane of the network, i.e., the actual data packets flowing on the network, by, for example, injecting HTTP errors, connection resets, packet drops, etc. According to an embodiment, chaos engineering trail 1 is run asynchronously and can either be triggered by a user or scheduled to run at a certain time. Results of chaos engineering trial 1 can then be stored in the database 70. Further, as depicted in the figure, an event indicating the start of the trial execution can also be provided from the processor 100 to the central API 90, which can then be retrieved by the observability system 110, thereby allowing other users and/or systems to monitor and automate control of the distributed system. Then, after the execution of the chaos engineering trial 1 is completed, the results of the executed trial can be provided to the database 70 as well as the central API 90 (and, therefore, the observability system 110). Further, according to an embodiment, in order to gain more confidence in the chaos engineering experiment A, additional iterations of the experiment can be executed in the test environment, with each iteration being associated with a distinct chaos engineering trial having distinct parameters. For example, the parameters for each trial can be changed by changing the "app_name" attribute between trials. As such, the same experiment could be run in different trials while targeting (e.g., killing) different applications. Then, after a sufficient number of iterations, as determined by the user(s) 10, the method can proceed to the next step. In particular, as depicted in the figure, in a third step, the user(s) 10 can generate a second chaos engineering trial for chaos engineering experiment A, e.g., chaos engineering trial 2. In particular, chaos engineering trial 2 can be generated for a production environment, e.g., "PROD." Similar to chaos engineering trial 1, chaos engineering trial 2 can be generated based on the chaos engineering experiment A stored in the database 70 and a number of parameters provided by the user(s) 10, e.g., particular environment, particular time, other external factors, etc. In this regard, chaos engineering trials 1 and 2 have the same pre-steps and steps but different parameters. In particular, referring to FIG. 1B, the "env" (e.g., environment) value in parameters changes from "TEST" in chaos engineering trial 1 to "PROD" in chaos engineering trial 2. Further, chaos engineering trial 2 can also be executed by the processor 100. Further, similar to the chaos engineering trial 1, the chaos engineering trial 2 can be executed to test at least one of (i) a computer application, (ii) container in which the computer application is running, (iii) the infrastructure platform on which the container is available, and (iv) the network layer underlying the computer application, the container, and the infrastructure platform. Further, the chaos engineering trail 2 is also run asynchronously and can either be triggered by a user or scheduled to run at a certain time. Results of chaos engineering trial 2 can then be stored in the database 70. Further, as depicted in the figure, an event indicating the start of the trial execution can also be provided from the processor 100 to the central API 90, which can then be retrieved by the observability system 110, thereby allowing other users and/or systems to monitor and automate control of the distributed system. Then, after the execution of the chaos engineering trial 2 is completed, the results of the executed trial can be provided to the database 70 as well as the central API 90 (and, therefore, the observability system 110). According to an embodiment, because the chaos engineering experiment A was executed in a lower environment, e.g., the test environment, via the chaos engineering trials 1 before being promoted to a higher, user-facing environment, e.g., production environment, via the chaos engineering trial 2, users may gain confidence in the tested system's ongoing resiliency. Further, after the chaos engineering experiment A is promoted to the production environment via the chaos engineering trial 2, the chaos engineering trial 2 can then be run continuously on a schedule, e.g., once a week. This ensures that any changes to the system's resiliency characteristics (e.g., due to environmental changes or new versions being deployed) can be caught during such periodic runs.

Further, according to an embodiment, either of the chaos engineering trials 1 or 2 can be tagged, by the processor 100, with metadata based on the situation or environment that run the specifications of the chaos engineering experiments. For example, the chaos engineering trials can be tagged with the metadata depicted in FIG. 1C. This metadata can then be injected into the firm's observability system 110, which can provide a number of services using the metadata, such as monitoring, logging, event stream, and alerting. In this way, executed chaos engineering trials can be tracked back deterministically.

According to an embodiment, a continuous integration/continuous delivery (CI/CD) pipeline can execute the same chaos engineering experiment via chaos engineering trials in different build pipelines, thereby allowing a user to track the hypothesis associated with the chaos engineering experiment over a period of time. In particular, the pipelines can track and pin-point the exact changes which lead to the break in resiliency.

Further, by providing a distinction between the chaos engineering experiment and the corresponding chaos engineering trials, the chaos engineering experiments can be treated as shareable artifacts. These shareable artifacts can be promoted from lower to higher environments without requiring the generation of new chaos engineering experiments for each environment. Further, because the chaos engineering trials are associated with a particular chaos engineering experiment, an audit log can be maintained for the chaos engineering experiment during the different executions of the chaos engineering trials, thereby ensuring that proper controls and audit trails for the chaos engineering experiments are followed.

Figure 3:
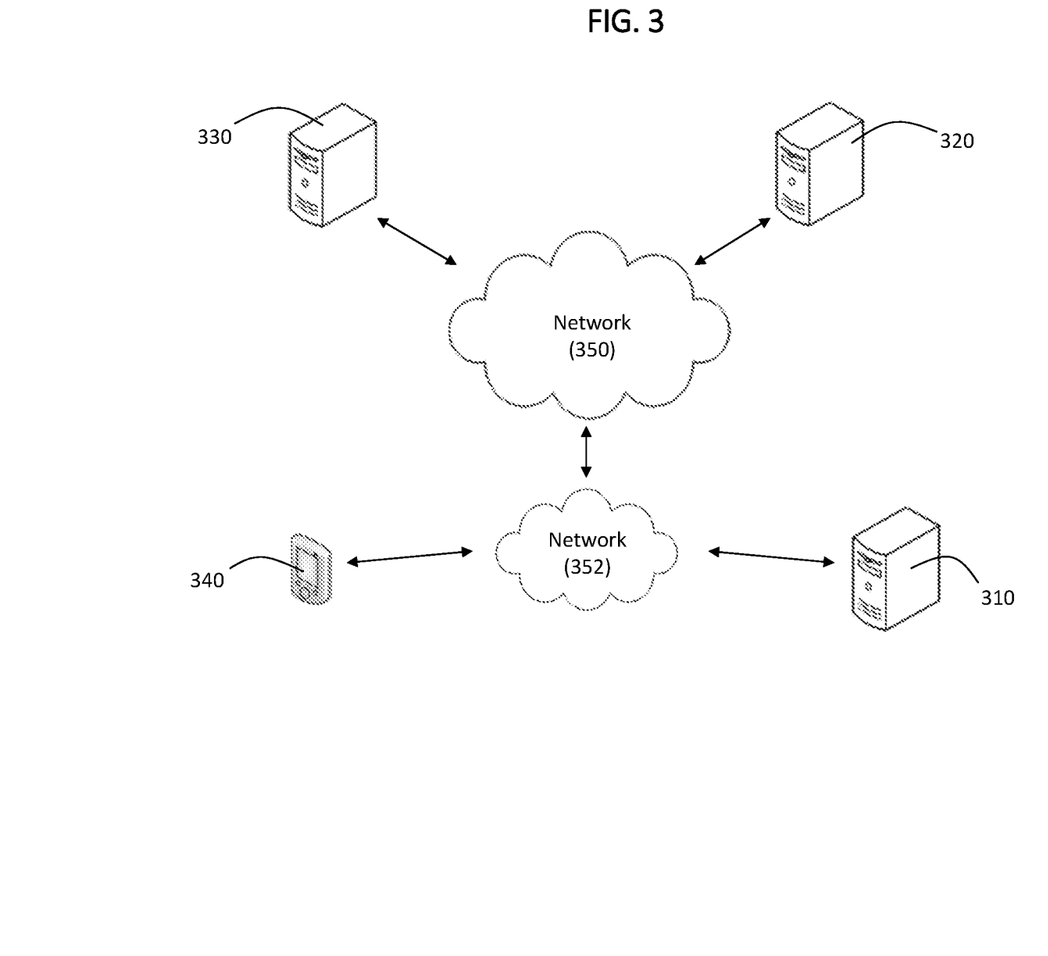
FIG. 3 illustrates a system implementing the process flow and component interaction of FIGS. 1 and 2, respectively, according to an exemplary embodiment of the present invention.

FIG. 3 illustrates a system implementing the process flow and component interaction of FIGS. 1 and 2, respectively, according to an exemplary embodiment of the present invention. As shown in FIG. 3, the system may include one or more computing devices, such as servers 310, 320, 330, and personal computing device 340. The system may also include one or more networks 350, 352 that connect the various computing devices shown in FIG. 3. Although only one personal computing device 340 and three servers 310, 320, 330 are shown in FIG. 3 to illustrate principles of the invention, in practice additional devices and servers may be involved in implementation of various embodiments of the invention. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example.

The system implementing the process flow and component interaction can be embodied primarily in a server 310, which performs the methods described above for generating and executing the trials 50. In this regard, the framework API 40, database 70, and processor 100 can be implemented in the server 310. The system may also include, or interface with, servers 320 and 330 that store and provide data that is input to the server 310. The system may be accessed and controlled by a personal computing device 340 which may comprise a mobile phone, tablet computer, laptop computer, or desktop computer, for example. For example, the user interface and API 80 may be implemented and displayed in the personal computing device 340.

Figure 4:
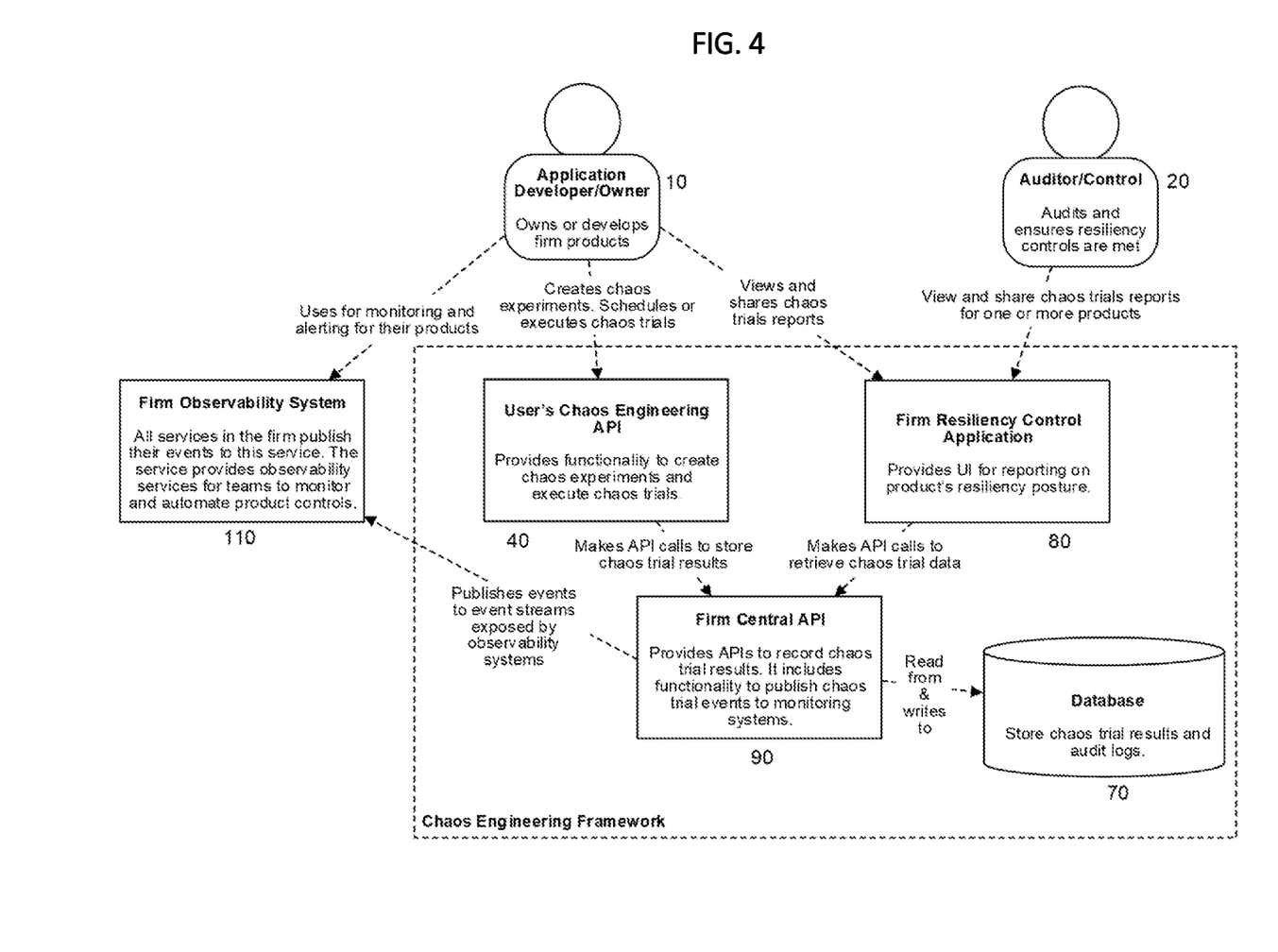
FIG. 4 illustrates an interaction between a chaos engineering framework application programming interface and an observability system according to an exemplary embodiment of the present invention.

FIG. 4 illustrates an interaction between the chaos engineering framework and an observability system. In particular, the figure illustrates a container diagram including the chaos engineering framework, the observability system 110, the user 10, and the auditor/control personnel 20. As depicted in the figure, the chaos engineering framework includes the framework API 40 (which provides the functionality to create the chaos engineering experiments and trials), the user interface and API 80 (which provides the UI for reporting the tested system's resiliency posture), the central API 90 (which provides the APIs to record the chaos engineering trial results, and also includes functionality to publish chaos engineering trial events to monitoring systems, e.g., the observability system 110), and the database 70 (which stores the chaos engineering trial results as well as audit logs). Further, the framework API 40 is configured to make API calls to the central API 90 in order to store the chaos engineering trial results in the database 70. Similarly, the user interface and API 80 is also configured to make API calls to the central API 90 in order to retrieve chaos engineering trial data from the database 70. In this regard, the central API 90 is configured to write to and read from the database 70. In addition, as further depicted in the figure, the user 10 and the auditor/control personnel 20 can interact with the chaos engineering framework. For example, the user 10 can: (i) create the chaos engineering experiments as well as schedule and/or execute the chaos engineering trial with the framework API 40, (ii) view and share the chaos engineering trial reports with the user interface and API 80, and (iii) monitor and provide alerting for the tested systems using the observability system 110. Further, the auditor/control personnel 20 can also view and share the chaos engineering trial reports using the user interface and API 80.

Figure 5:
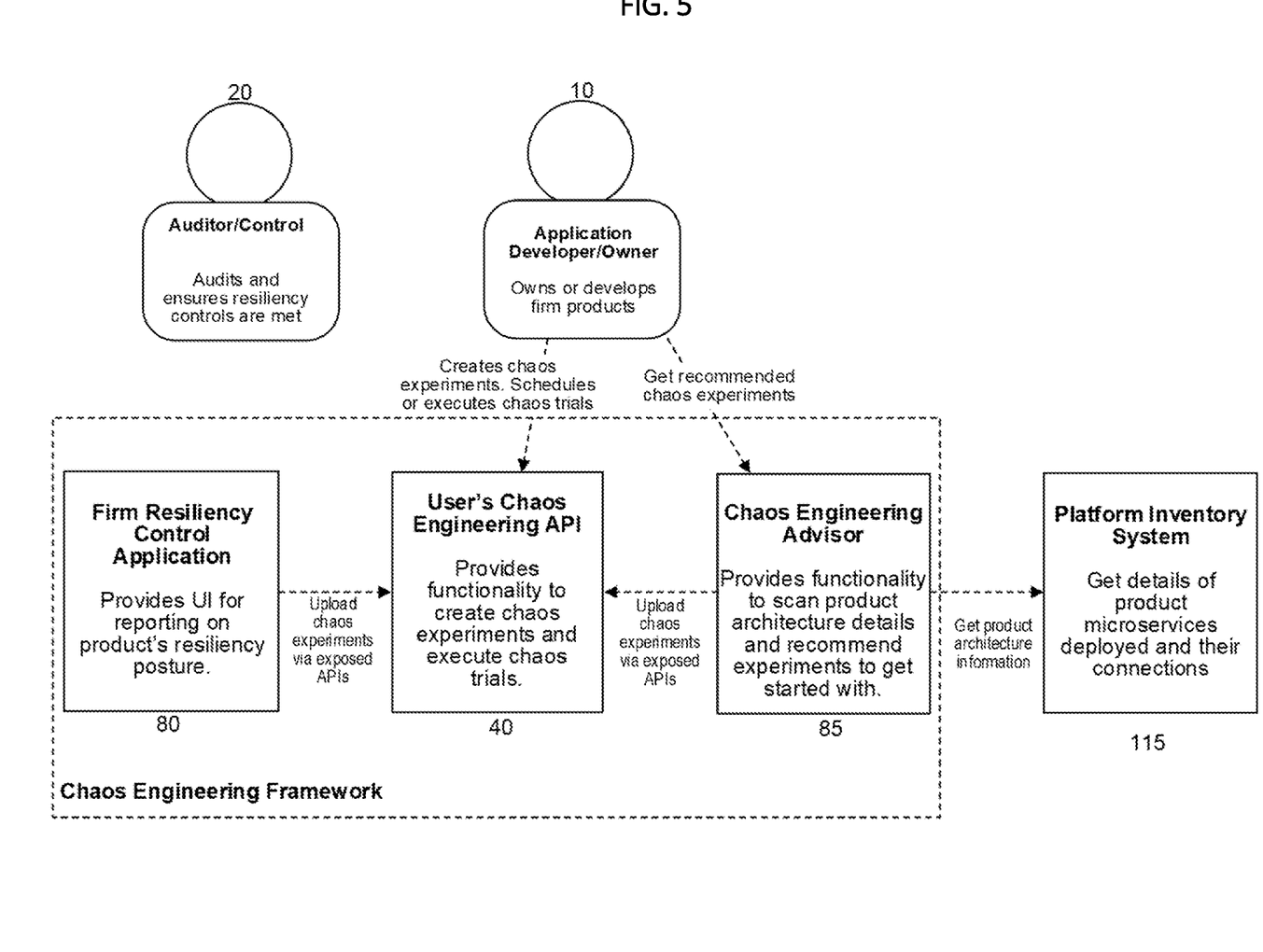
FIG. 5 illustrates a chaos engineering experiment recommendation engine according to an exemplary embodiment of the present invention.

FIG. 5 illustrates a chaos engineering experiment recommendation engine according to an exemplary embodiment of the present invention. According to an embodiment, the chaos engineering framework can include a chaos engineering experiment recommendation engine 85 (e.g., a software application module incorporating the logic to implement the recommendation engine). The chaos engineering experiment recommendation engine 85 is configured to generate suggested chaos engineering experiments based on architecture information about the system-to-be-tested. In particular, the chaos engineering experiment recommendation engine 85 is configured to scan the architecture information from a platform inventory system 115. According to an embodiment, the platform inventory system 115 is configured to retrieve information about the system-to-be-tested. For example, the platform inventory system 115 is configured to get details about which of the system's microservices are deployed as well as their corresponding connections. After generating the suggested chaos engineering experiments, the chaos engineering experiment recommendation engine 85 can then provide the suggested experiments to the user 10. Further, as depicted in the figure, the framework API 40 can upload the suggested experiments from the chaos engineering experiment recommendation engine 85.

Figure 6:
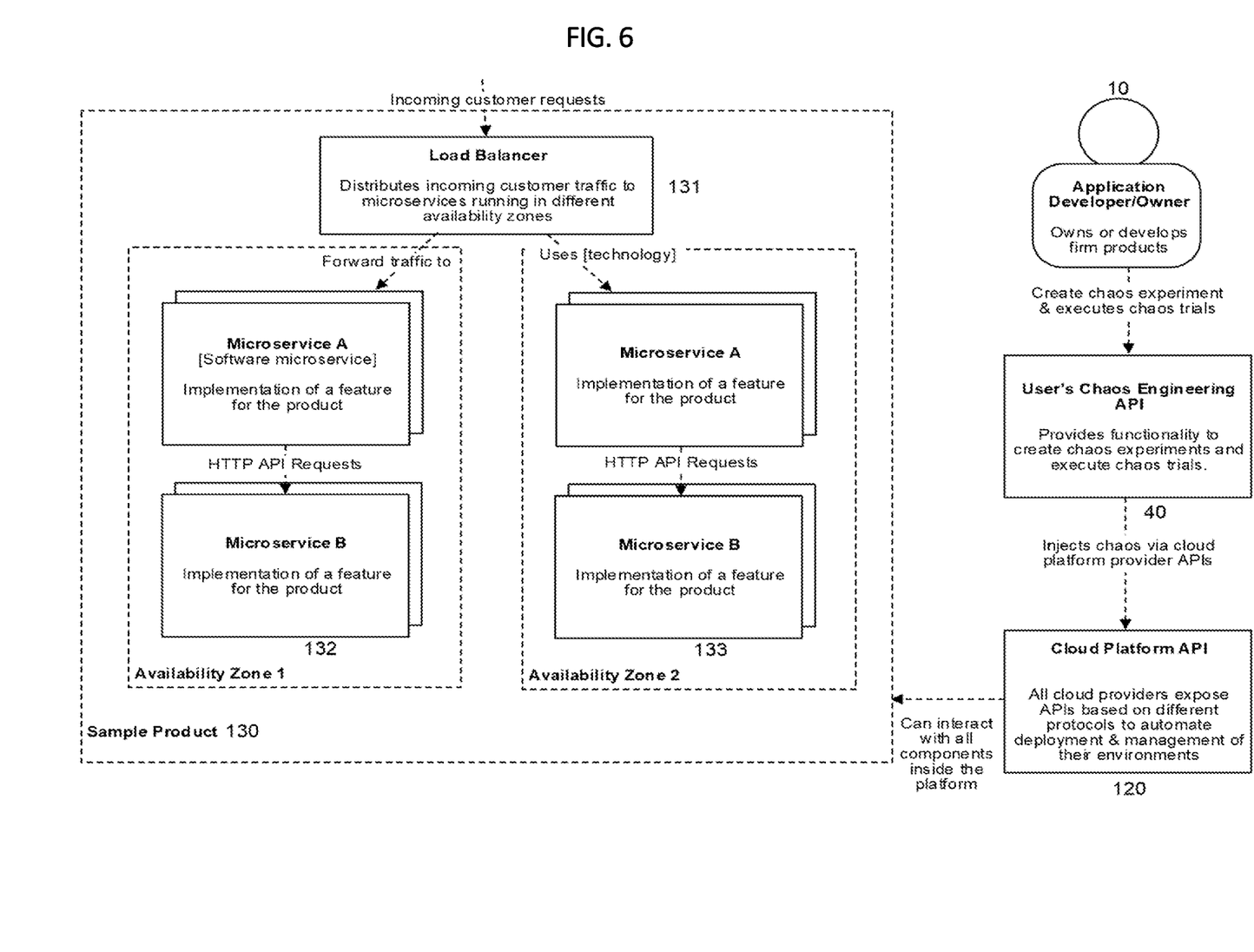
FIG. 6 illustrates a distributed system under test according to an exemplary embodiment of the present invention.

FIG. 6 illustrates a distributed system under test according to an exemplary embodiment of the present invention. In particular, the figure depicts a sample system, e.g., product 130 that is running on a cloud computing platform. According to an embodiment, the product 130 includes a load balancer 131, an availability zone 132, and an availability zone 133. As depicted in the figure, each of availability zones 132 and 133 include microservices, e.g., mircoservices A and B, which are implementations of the corresponding product's features. Further, according to an embodiment, the load balancer 131 is configured to (i) receive incoming customer requests from a cloud platform API 120 and (ii) distribute the received customer traffic to microservices running in availability zones 131 and 132. In addition to providing customer requests to the load balancer 131, the cloud platform API 120 is configured to interact with other components inside the cloud platform as well. In particular, the cloud platform API 120 is configured to automate deployment and management of the cloud computing platform. In this regard, the cloud platform API 120 is configured to receive failure injections for the cloud computing platform from the framework API 40. According to an embodiment, the failure injections may be first provided in a chaos engineering trial in a lower environment, e.g., test environment, before being implemented during normal operation in the higher environment, e.g., production environment. Further, unlike the production environment, in which the product 130 can be tested during its normal operation, components in the product 130 that are tested during the test environment must first be deactivated. For example, if the availability zone 133 is being tested in the test environment, availability zone 133 and its corresponding microservices need to be deactivated first before being tested. Similarly, if only a microservice within the availability zone is being tested, only that microservice needs to be deactivated in the test environment. The component, e.g., availability zone 133 or one of the corresponding microservices, are then reactivated during the test in the production environment.

Figure 7:
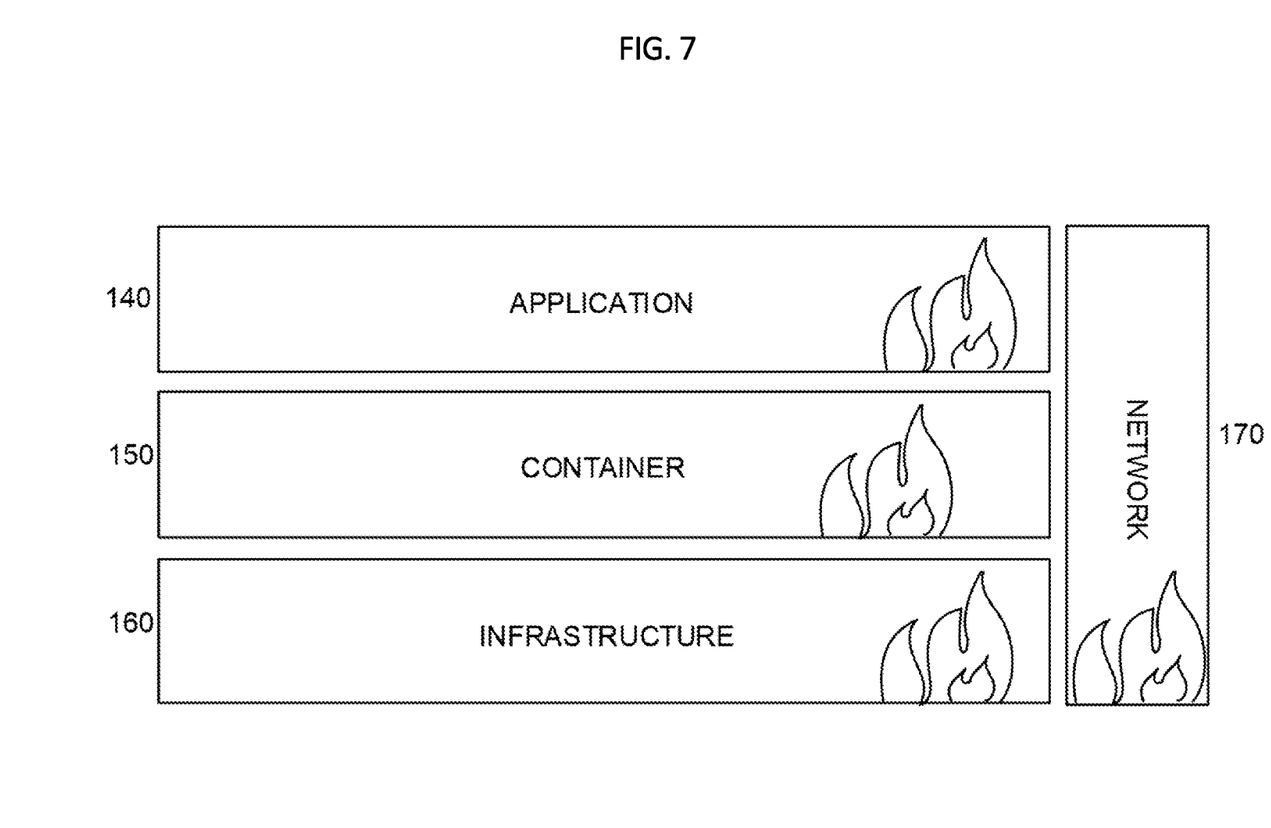
FIG. 7 illustrates examples of the different types of failure injection in distributed systems.

FIG. 7 illustrates examples of the different types of failure injection in distributed systems. For example, the distributed system can be at least one of (i) a computer application 140, (ii) a container 150, in which the computer application is running, (iii) an infrastructure platform 160, on which the container is available, and (iv) a network layer 170 underlying the computer application 140, the container 150, and the infrastructure platform 160.

According to an embodiment, with the present invention, the chaos engineering experiments can be utilized as one of (i) specifications, (ii) shareable/reusable documents, and (iii) production code that can be thoroughly tested in a variety of environments. Further, the chaos engineering trials can be utilized as unique experiment execution instances as well as to classify individual situations (e.g., traffic during execution, time of day during execution, ongoing events, etc.).

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine utilized to hold the set of instructions and/or the data used in the invention may take on any of a variety of physical forms or transmissions. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen, for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-implemented method for implementing chaos engineering in a distributed system, the method comprising:
    generating, with a Representational State Transfer (RESTful) application programming interface (API), a chaos engineering experiment, the chaos engineering experiment comprising a plurality of pre-steps and steps that test one or more conditions in a distributed system;
    generating, with the RESTful API, a first chaos engineering trial based on the chaos engineering experiment and one or more parameters, wherein the first chaos engineering trial comprises one or more failure injections for the distributed system and is configured to be run in a test environment;
    executing the plurality of pre-steps on the distributed system in the test environment prior to running the chaos engineering experiment, and upon failure of at least one pre-step, aborting the chaos engineering experiment;
    deactivating, in the test environment, a portion of the distributed system prior to executing the first chaos engineering trial such that the portion deactivated comprises one or more components of the distributed system to be tested as part of the first chaos engineering trial; and
    executing, with at least one processor, the first chaos engineering trial in the distributed system.

2. The method of claim 1, further comprising:
    generating, with the RESTful API, a second chaos engineering trial based on the chaos engineering experiment and the one or more parameters, wherein the second chaos engineering trial is executed in a production environment; and
    executing, with the at least one processor, the second chaos engineering trial in the production environment following execution of the first chaos engineering trial in the test environment such that the portion of the distributed system deactivated for the first chaos engineering trial is reactivated and tested using the second chaos engineering trial during normal operation.

3. The method of claim 1, further comprising,
    tagging, with the at least one processor, the first chaos engineering trial with metadata; and
    tracking, with the at least one processor, the first chaos engineering trial based on the metadata.

4. The method of claim 1, further comprising:
    providing, with the at least one processor, an event indicating a start of the execution of the first chaos engineering trial to a central API;
    retrieving, with an observability system, the event from the central API; and
    monitoring, with the observability system, the first chaos engineering trial based on the retrieved event.

5. The method of claim 1, further comprising:
    scanning, with a recommendation engine, the distributed system's architecture information;
    generating, with the recommendation engine, a suggested chaos engineering experiment based on the scanned architecture information.

6. The method of claim 1, wherein the distributed system includes at least one of (i) a computer application, (ii) a container in which the computer application is running, (iii) an infrastructure platform on which the container is available, or (iv) a network layer underlying the computer application, the container, and the infrastructure platform.

7. A system for implementing chaos engineering in a distributed system, the system comprising:
    a Representational State Transfer (RESTful) application programming interface (API) configured to:
        generate a chaos engineering experiment, wherein the chaos engineering experiment comprises a plurality of pre-steps and steps that test one or more conditions in a distributed system;
        execute the plurality of pre-steps on the distributed system prior to running the chaos engineering experiment, and upon failure of at least one pre-step, aborting the chaos engineering experiment;
        generate a first chaos engineering trial based on the chaos engineering experiment and one or more parameters and comprising one or more failure injections for execution in a test environment; and
        deactivate, in the test environment, a portion of the distributed system prior to executing the first chaos engineering trial such that the portion deactivated comprises one or more components of the distributed system to be tested as part of the first chaos engineering trial; and
    at least one processor that is configured to execute the first chaos engineering trial in the distributed system in the test environment.

8. The system of claim 7, the RESTful API being further configured to:
    generate a second chaos engineering trial based on the chaos engineering experiment and the one or more parameters, wherein the second chaos engineering trial is executed in a production environment; and
    execute, using the at least one processor, the second chaos engineering trial in the production environment following execution of the first chaos engineering trial in the test environment such that the portion of the distributed system deactivated for the first chaos engineering trial is reactivated and tested using the second chaos engineering trial during normal operation.

9. The system of claim 7, the at least one processor being further configured to:
    tag the first chaos engineering trial with metadata; and
    track the first chaos engineering trial based on the metadata.

10. The system of claim 7, further comprising:
    a central API configured to store data from a plurality of applications to: (a) generate events for monitoring and notification purposes; and (b) report on the distributed system's resiliency posture.

11. The system of claim 10, the central API being further configured to:
    retrieve, from the at least one processor, an event indicating a start of the execution of the first chaos engineering trial.

12. The system of claim 11, further comprising:
    an observability system configured to:
        retrieve the event from the central API; and
        monitor the first chaos engineering trial based on the retrieved event.

13. The system of claim 7, further comprising:
    a recommendation engine configured to:

scan the distributed system's architecture information; and generate a suggested chaos engineering experiment based on the scanned architecture information.

14. The system of claim 7, wherein the distributed system includes at least one of (i) a computer application, (ii) a container in which the computer application is running, (iii) an infrastructure platform on which the container is available, or (iv) a network layer underlying the computer application, the container, and the infrastructure platform.

* * * * *